US011022026B2

(12) United States Patent
Kraemer et al.

(10) Patent No.: US 11,022,026 B2
(45) Date of Patent: Jun. 1, 2021

(54) METHODS AND SYSTEMS FOR A PRECHAMBER

(71) Applicant: Ford Global Technologies, LLC, Dearborn, MI (US)

(72) Inventors: Frank Kraemer, Neunkirchen-Seelscheid (DE); Oliver Berkemeier, Bergisch Gladbach (DE); Helmut Ruhland, Eschweiler (DE); Thomas Lorenz, Cologne (DE); Albert Breuer, Cologne (DE); Maziar Khosravi, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/918,210

(22) Filed: Jul. 1, 2020

(65) Prior Publication Data

US 2021/0003066 A1    Jan. 7, 2021

(51) Int. Cl.
*F02B 19/18*    (2006.01)
*F02F 1/24*    (2006.01)
*F02B 19/12*    (2006.01)

(52) U.S. Cl.
CPC .............. *F02B 19/18* (2013.01); *F02B 19/12* (2013.01); *F02F 1/242* (2013.01)

(58) Field of Classification Search
CPC ............ F02B 19/18; F02B 19/12; F02F 1/242
See application file for complete search history.

(56) References Cited

U.S. PATENT DOCUMENTS

| 5,024,193 | A | * | 6/1991 | Graze, Jr. | ............... | F02B 19/18 |
| | | | | | | 123/259 |
| 5,046,466 | A | * | 9/1991 | Lipski | ..................... | F02P 15/02 |
| | | | | | | 123/310 |
| 5,105,795 | A | * | 4/1992 | Ozawa | .................... | F02F 1/242 |
| | | | | | | 123/661 |
| 9,225,151 | B2 | | 12/2015 | Douglas et al. | | |
| 9,850,806 | B2 | | 12/2017 | Sotiropoulou et al. | | |
| 10,557,403 | B2 | * | 2/2020 | Sager | .................. | F02D 41/0032 |
| 10,837,355 | B2 | * | 11/2020 | Endo | ................ | F02M 35/10216 |
| 2004/0123849 | A1 | * | 7/2004 | Bryant | ...................... | F01L 3/08 |
| | | | | | | 123/563 |
| 2014/0130770 | A1 | * | 5/2014 | Liu | ......................... | F02B 33/22 |
| | | | | | | 123/25 A |
| 2016/0214192 | A1 | * | 7/2016 | Friedrich | .............. | B23D 79/005 |
| 2016/0245151 | A1 | * | 8/2016 | Yuuki | ..................... | F02B 19/08 |
| 2018/0363539 | A1 | | 12/2018 | Shelby et al. | | |

FOREIGN PATENT DOCUMENTS

| AT | 508618 B1 | 5/2011 |
| DE | 2410803 A1 | 9/1975 |
| DE | 102005017186 A1 | 10/2006 |
| DE | 102015210669 A1 | 12/2016 |
| DE | 102015221286 A1 | 5/2017 |
| JP | 5426998 B2 | 2/2014 |

* cited by examiner

*Primary Examiner* — Joseph J Dallo
(74) *Attorney, Agent, or Firm* — Geoffrey Brumbaugh; McCoy Russell LLP

(57) ABSTRACT

Methods and systems are provided for a prechamber. In one example, the prechamber comprises an interior volume fluidly coupled to flow channels of an ignition plug and a bracket. The bracket is configured to move relative to the ignition plug and a cylinder head to misalign the flows channels and block the flow of air to the interior volume.

20 Claims, 2 Drawing Sheets

METHODS AND SYSTEMS FOR A PRECHAMBER

CROSS REFERENCE TO RELATED APPLICATIONS

The present application claims priority to German Patent Application No. 102019209753.7 filed on Jul. 3, 2019. The entire contents of the above-listed application is hereby incorporated by reference for all purposes.

FIELD

The present description relates generally to an ignition plug with a prechamber and to a method for operating an ignition plug with a prechamber.

BACKGROUND/SUMMARY

Ignition plugs with pre-chambers may enhance combustion under certain operating conditions, but may face certain drawbacks, such as pre-ignition. Here, one challenge consists in flushing the prechamber completely of hot combustion gases, in particular in the region between the isolator and the housing in the upper region of the prechamber. In the event of inadequate flushing, premature ignition can occur in these regions. Furthermore, an ignition electrode arranged in the prechamber is difficult to cool, in particular because, most of the time, said ignition electrode is surrounded by hot combustion gases.

In one previous example as shown in DE 102005017186A1 describes a method for flushing the prechamber of an ignition plug, as far as, and including, into the region of the ignition electrodes. Here, the residual gas that is present in the prechamber at the start of compression is, during the compression process, forced out of the prechamber via outlet channels situated in the rear region of the ignition chamber.

Other examples are shown in U.S. 2018/0363539 A1, U.S. Pat. No. 9,225,151 B2 and U.S. Pat. No. 9,850,806 B2 which also describe ignition plugs with prechambers. The document JP 5426998 B2 describes an ignition plug with a prechamber, wherein the volume of the prechamber can be varied by displacement of a cover in relation to the ignition plug body.

In one example, the issues described above associated with flushing the prechamber may be addressed by a system, comprising an ignition plug comprising an outer wall, a combustion-chamber-side end, and a combustion-chamber-averted end. The outer wall comprises a combustion-chamber-side region configured to be arranged in a combustion chamber. A prechamber is arranged at the combustion-chamber-side end, wherein the prechamber comprises at least one ignition electrode and at least one combustion-chamber-side opening configured to conduct a mixture ignited in the prechamber into the combustion chamber.

The outer wall is at least partially surrounded in a circumferential direction by a bracket, wherein a first flow channel extends through the outer wall and a second flow channel extends through the bracket, wherein the first flow channel and the second flow channel fluidly couple the prechamber to the combustion-chamber-side region, and wherein the first flow channel and the second flow channel are configured to be opened and closed based on a displacement of the bracket.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
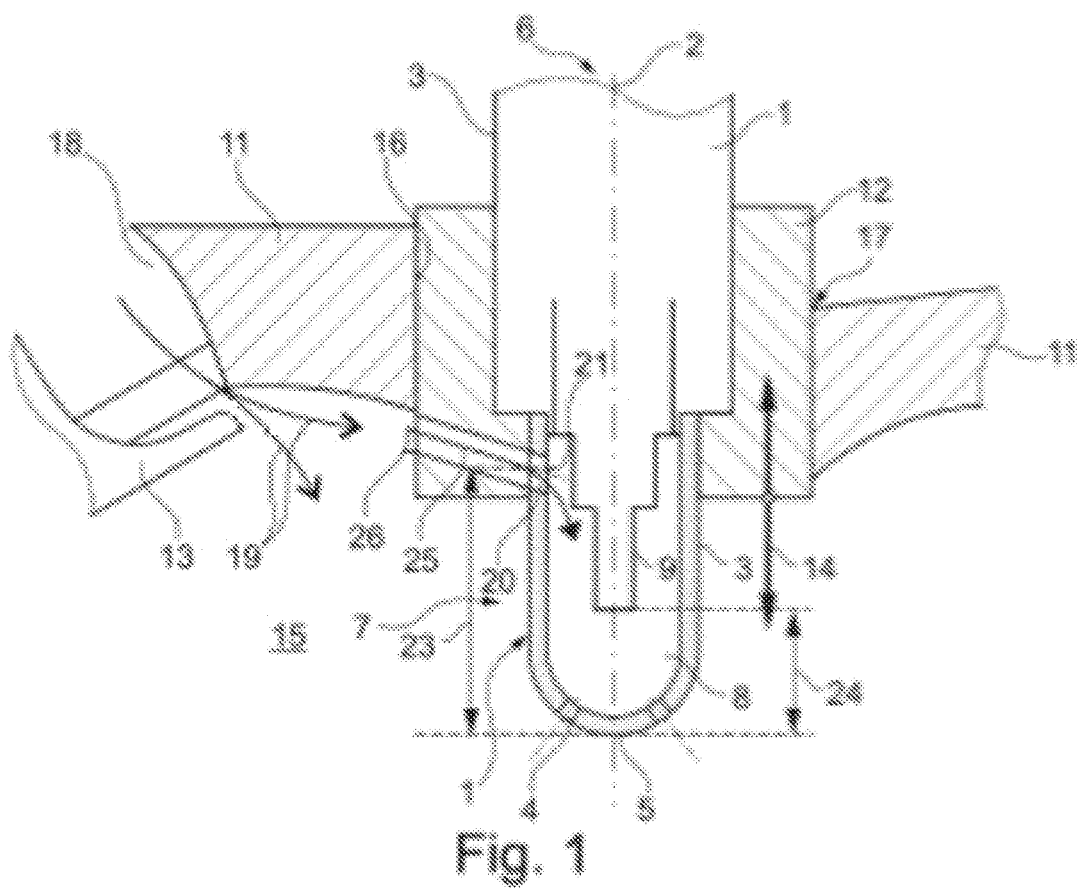
FIG. 1 schematically shows a detail of a cylinder head according to the disclosure with an ignition plug according to the disclosure in a partially sectional view.

The following description relates to systems and methods for an ignition plug with a prechamber. The ignition plug according to the disclosure comprises an outer wall, an axial axis, a combustion-chamber-side or combustion-chamber-facing end in an axial direction and a combustion-chamber-averted end. The outer wall comprises a combustion-chamber-side region which is configured to be arranged in a combustion chamber, for example by projecting into a combustion chamber. A prechamber is arranged at the combustion-chamber-side end or in the region of the combustion-chamber-side end. At least one ignition electrode is arranged in the prechamber. The prechamber comprises at least one combustion-chamber-side opening, that is to say an opening facing in the direction of the combustion chamber. The at least one combustion-chamber-side opening is configured for conducting or for transferring a mixture ignition spark ignited in the prechamber into a combustion chamber.

The outer wall is at least partially surrounded in a circumferential direction by a bracket. At least one flow channel for the flushing of the prechamber extends through the bracket and the outer wall in the region of the prechamber, which at least one flow channel connects the prechamber to the combustion-chamber-side region in terms of flow. The flow channel for the flushing of the prechamber is configured to be opened and closed, in an installed state in a cylinder head, via a displacement of the bracket, in particular via a displacement in an axial direction, in relation to the cylinder head.

The ignition plug according to the disclosure has the advantage that it permits flushing of the upper region or of the combustion-chamber-averted region of the prechamber, in particular by virtue of an outflow of the residual gas being effected. At the same time, overheating of the ignition electrodes is thus avoided. Furthermore, flushing with fresh gas is possible. The prechamber can thus be optimally prepared for a subsequent combustion with regard to the fuel-air mixture in the prechamber.

In one example, the flow channel has a prechamber-side inlet which is arranged with a spacing to the combustion-chamber-side end in the axial direction of the ignition plug, wherein the spacing is greater than the spacing of the ignition electrode to the combustion-chamber-side end in the axial direction. Efficient flushing of the rear region of the prechamber is thus made possible. The flow channel for the flushing of the prechamber may furthermore have a central axis which comprises a component running in a radial direction. This has the advantage that the flow channel can be covered and thus closed off in the case of a displacement of the bracket through an inner wall of an opening, in which the bracket is arranged, in a cylinder head.

In another example, the at least one flow channel is configured as a passage bore. This may permit straightforward and inexpensive production of an ignition plug according to the disclosure with flow channel for the flushing of the upper and/or rear region of the prechamber. Furthermore, in this way, retrofitting of ignition plugs is possible in a straightforward and inexpensive manner.

It is further possible for the cross-sectional area or the flow cross section, for example the diameter, of the flow channel for the flushing of the prechamber to be configured to be variable, in particular adjustable. It is thus possible for the cross-sectional area to be adapted for example to the respective operating situation.

In another embodiment, the bracket may be at least partially displaceable in an axial direction in relation to the outer wall of the ignition plug. This configuration has the advantage that the flow channel for the flushing of the prechamber can be opened and closed both via a displacement of the bracket in relation to a cylinder head and via a displacement of the bracket in relation to the outer wall of the ignition plug.

The cylinder according to the disclosure for an internal combustion engine comprises a cylinder head and an ignition plug according to the disclosure arranged in the cylinder head. The bracket is configured to be displaceable in relation to the cylinder head. Here, the bracket may be configured to be displaceable in relation to the cylinder head in an axial direction and/or in a radial direction.

For the displacement of the bracket, the cylinder according to the disclosure may comprise a hydraulic device and/or an electrical device and/or a mechanical device.

In one example, the cylinder head comprises an inlet valve and the bracket is configured to be displaceable in a manner dependent on the valve position of the inlet valve. In this way, flushing of the prechamber with fresh air is possible in a manner adapted to the operating state of the cylinder. For example, the degree of opening of the flow channel can be controllable proportionally to the degree of opening of the inlet valve. Further examples will be discussed below on the basis of a method according to the disclosure.

In the context of the method according to the disclosure for operating a cylinder according to the disclosure as described above, if the inlet valve is opened, the prechamber of the ignition plug is flushed by virtue of the flow channel for the flushing of the prechamber being opened by displacement of the ignition plug and/or of the bracket in relation to the cylinder head and air being introduced into the prechamber via the flow channel. The method according to the disclosure permits efficient flushing of the prechamber, adapted to the operating situation, in a simple and thus inexpensive manner.

The flow channel for the flushing of the prechamber is advantageously opened and closed in a manner dependent on the degree of opening of the inlet valve. In particular, the flow channel may be opened and closed proportionally to the degree of opening of the inlet valve.

In a preferred variant, during the opening of the flow channel, the bracket is pushed in an axial direction partially out of the cylinder head and into the combustion chamber, and, during the closing of the flow channel, said bracket is pushed in the axial direction back into the cylinder head such that the flow channel is closed by a wall of the cylinder head, for example by the inner surface of an opening in which the ignition plug is arranged.

The displacement of the bracket may be performed via a hydraulic device and/or electrical device and/or via an electrical device coupled to the inlet valve and/or via a mechanical device coupled to a camshaft. The cylinder according to the disclosure may comprise a device of said type.

The internal combustion engine according to the disclosure comprises an above-described ignition plug according to the disclosure and/or a cylinder according to the disclosure. The internal combustion engine may be an engine for a motor vehicle or for a ship.

The vehicle according to the disclosure, which may for example be a motor vehicle or a ship, comprises an above-described internal combustion engine according to the disclosure. The motor vehicle may for example be a heavy goods vehicle, a passenger motor vehicle, a motorcycle, a moped, a bus or a minibus. The internal combustion engine according to the disclosure and the vehicle according to the disclosure have basically the same features and advantages as the above-described ignition plug according to the disclosure, the cylinder according to the disclosure and the method according to the disclosure.

The disclosure will be discussed in more detail below on the basis of exemplary embodiments and with reference to the appended figures. Although the disclosure is illustrated and described in more detail on the basis of the preferred exemplary embodiments, the disclosure is not restricted by the disclosed examples, and other variations may be derived therefrom by a person skilled in the art without departing from the scope of protection of the disclosure.

The figures are not necessarily accurate in all details and true to scale, and may be presented on an enlarged scale or a reduced scale in order to provide a better overview. Therefore, functional details disclosed here are to be understood not as being of a limiting nature but rather merely as an illustrative basis that provides a person skilled in the art in this technological field with guidance for using the present disclosure in a versatile manner.

The expression "and/or" used here, where used in a series of two or more elements, means that each of the stated elements may be used individually, or any combination of two or more of the stated elements may be used. For example, if a configuration is described which comprises the components A, B and/or C, the configuration may comprise A on its own; B on its own; C on its own; A and B in combination; A and C in combination; B and C in combination; or A, B and C in combination.

FIG. 1 schematically shows a detail of a cylinder head 11 with an ignition plug 1 according to the disclosure in a partially sectional view. The cylinder head 11 comprises a first opening 17 in which the ignition plug 1 is arranged, and a second opening 18 with an inlet valve 13. The first opening 17 has an inner surface 16.

The ignition plug 1 has an axial axis 2. The ignition plug 1 furthermore has an outer wall 3. The ignition plug 1 furthermore comprises, in the axial direction 2, a combustion-chamber-side end 5 and a combustion-chamber-averted end 6, which is not explicitly shown in FIG. 1. The outer wall 3 comprises a combustion-chamber-side region 7 which is configured for being arranged in a combustion chamber 15, or for projecting into a combustion chamber 15.

In one example, the ignition plug 1 protrudes into an interior volume of the combustion chamber 15 such that the ignition plug 1 extends through a fire deck or other portion of the cylinder head 11 defining an uppermost portion of the combustion chamber 15.

A prechamber 8 is arranged at the combustion-chamber-side end 5. At least one ignition electrode 9 is arranged in the prechamber 8 and configured to ignite a mixture (e.g., fuel and air) in an interior volume of the prechamber 8. Furthermore, the prechamber 8 comprises at least one combustion-chamber-side opening 4 for conducting or for transferring a mixture ignition spark ignited in the prechamber into the combustion chamber 15. In the example of FIG. 1, two combustion-chamber-side openings 4 are shown by way of example. It will be appreciated that there may be greater than two combustion-chamber-side openings 4 evenly or unevenly distributed along a given circumference of the prechamber 8.

The outer wall 3 of the ignition plug 1 is at least partially surrounded in a circumferential direction by a bracket 12. The bracket 12 and the ignition plug 1 may be fixedly or detachably connected to one another. The coupling may include one or more of adhesives, fasteners, welds, and fusions.

A flow channel 20 is arranged in the outer wall 3 of the ignition plug 1 in the region of the prechamber 8. In the bracket 12, there is arranged a flow channel 25 which is connected in terms of flow to the flow channel 20 in the outer wall 3 and which, together with this, forms a flow channel for the flushing of the prechamber 8. Here, the flow channels 20 and 25 connect the prechamber 8 to the combustion-chamber-side region 7 and permit flushing of the prechamber 8. Herein, the flow channel 20 is a first flow channel 20 and the flow channel 25 is a second flow channel, wherein the first flow channel and the second flow channel are contiguous with one another.

The first flow channel 20 has a prechamber-side inlet 21 which is arranged in an axial direction parallel to an axial axis 2 so as to have a first spacing 23 to the combustion-chamber-side end 5 of the ignition plug 1, wherein the first spacing 23 is greater than a second spacing 24 of the at least one ignition electrode 9 to the combustion-chamber-side end 5 of the ignition plug 1 in the axial direction 2. This arrangement of the first and second flow channel 20, 25 permits flushing of the upper region of the prechamber 8, that is to say of the region that is situated above the ignition electrode 9 in FIG. 1. Said another way, air entering the prechamber 8 via the prechamber-side inlet 21 comprises a sufficient amount of space to clear an interior volume of the prechamber 8 via the configurations of the first spacing 23 and the second spacing 24.

The bracket 12 and the ignition plug 1 are arranged so as to be displaceable in relation to the cylinder head 11 in the axial direction 2. This is indicated by means of an arrow 14. The first and second flow channels 20 and 25 can be opened and closed by virtue of the bracket 12 being displaced in an axial direction. In order to close the first and second flow channels 20 and 25, the bracket 12 and the ignition plug 1 are displaced out of the combustion chamber 15 in the axial direction 2, that is to say upward in the variant shown, such that the second flow channel 25 is covered, and thus completely closed, by the inner surface 16 of the first opening 17. For the opening of the first and second flow channels 20 and 25, and thus for the flushing of the prechamber 8, the bracket 12 and the ignition plug 1 are displaced into the combustion chamber 15 in the axial direction 2, that is to say downward in the variant shown.

Said another way, the bracket 12 and the ignition plug 1 may move to and away from the combustion chamber 15. In one example, the bracket 12 and the ignition plug 1 are in a first position when flushing of the prechamber 8 is desired. FIG. 1 illustrates an example of the first position. The bracket 12 and the ignition plug 1 are moved to a second position when flushing of the prechamber 8 is not desired. In one example, the second position differs from the first position in that the bracket 12 and the ignition plug are moved away from the combustion chamber 15. In one example, a distance between the bracket 12 and the ignition plug 1 and a piston of the combustion chamber 15 is increased.

An embodiment in which the opening and closing of the first and second flow channels 20, 25 for the flushing of the prechamber 8 occurs via a displacement of the bracket 12 in a radial direction in relation to the ignition plug and/or the cylinder head is likewise conceivable. Furthermore, the bracket 12 may be arranged so as to be displaceable in relation to the outer wall 3 of the ignition plug 1 in the axial direction 2. It is for example possible for the cross-sectional area of the first and second flow channels 20, 25 to be adjusted in this way.

Said another way, the bracket 12 may be rotatable about the axial axis 2 while the outer wall 3 may remain stationary so as to block the flushing of the prechamber 8. Additionally or alternatively, the bracket 12 may be moveable parallel to the axial axis 2 while the ignition plug 1 and the outer wall 3 remain stationary as another configuration to introduce a misalignment between the first and second flow channels 20, 25 during instances where flushing of the prechamber 8 is not desired.

In one example, the degree of opening of the first and second flow channels 20 and 25 is controlled in open-loop or closed-loop fashion in a manner dependent on the valve position of the inlet valve 13, for example proportionally to the degree of opening of the inlet valve 13. FIG. 1 shows the opened state of the inlet valve 13 and of the flow channels 20 and 25. The flow direction of the air through the inlet valve 13 is denoted by the reference designation 19. The flow direction of the air through the flow channels 20 and 25 is denoted by the reference designation 26. For the flushing of the prechamber 8, it is thus firstly the case that air is forced into the prechamber 8 through the flow channel formed by the flow channels 20 and 25. During a compression stroke, fresh charge air and fuel passes through the combustion-chamber-side openings 4 into the prechamber 8 and fills this in preparation for the next ignition.

More specifically, the air 19 flows past the inlet valve 13 and enters the combustion chamber 15. As illustrated, there is a gap between where the air 19 enters the combustion chamber 15 (e.g., an inlet port) and an inlet of the second flow channel 25. In this way, the air 19 may be split such that a portion of it flows directly to the combustion chamber 15 and a remaining portion of the air 19 flows to the prechamber 8. In one example, the portion flowing to the combustion chamber 15 comprises a greater amount of air than the portion flowing to the second flow channel 25. In one example, a shape of one or more of the inlet valve 13, the cylinder 11, the inlet port in which the inlet valve is positioned, and the second flow channel 25 may promote air to enter the prechamber 8 during the intake stroke. In the example of FIG. 1, the portion of the cylinder head 11 between the inlet valve 13 and the second flow channel 25 is curved and concave relative to the piston of the combustion chamber 15.

The displacement of the bracket 12 and of the ignition plug 1 may be performed via a hydraulic device and/or an electrical device and/or by means of an electrical device for example coupled to the inlet valve and/or by means of a mechanical device for example coupled to a camshaft.

The flow cross sections, that is to say for example the diameters of the first and second flow channels 20 and 25, may be adjustable, that is to say variable in a manner adapted to the operating situation. In one example, an inflatable device, a valve, or other similar moveable device may be arranged in one or more of the first and second flow channels 20 and 25 to affect a flow rate of air therethrough.

Figure 2:
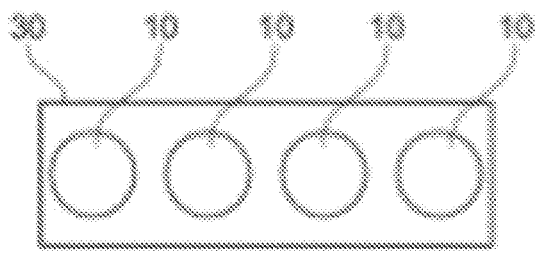
FIG. 2 schematically shows an engine arrangement according to the disclosure.
Figure 3:
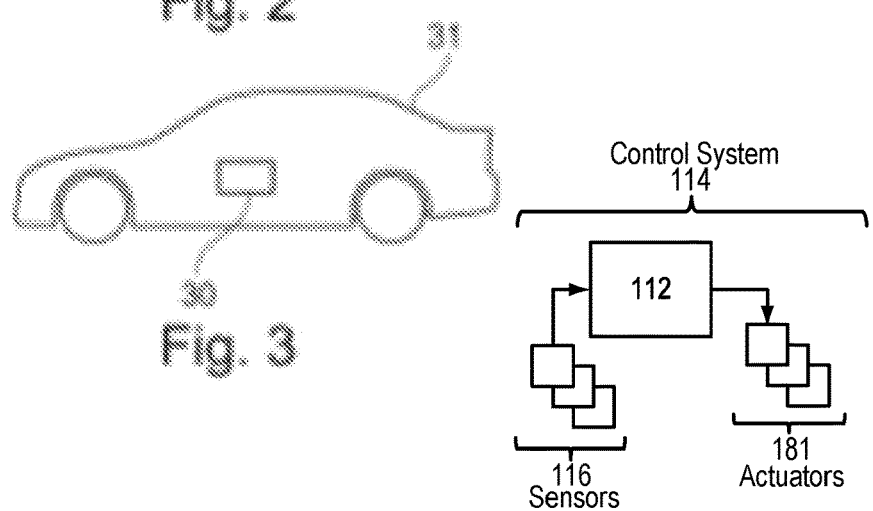
FIG. 3 schematically shows a motor vehicle according to the disclosure.

FIG. 2 schematically shows an internal combustion engine 30 which comprises a number of cylinders 10 according to the disclosure. In one example, one or more of the cylinders 10 may comprise the cylinder head 11 of FIG. 1, including the ignition plug 1 and the prechamber 8. FIG. 3 schematically shows a motor vehicle 31 according to the disclosure which comprises an internal combustion engine 30 according to the disclosure as shown in FIG. 2.

The motor vehicle 31 may further include control system 114. Control system 114 is shown receiving information from a plurality of sensors 116 (various examples of which are described herein) and sending control signals to a plurality of actuators 181 (various examples of which are described herein). As one example, sensors 116 may include throttle position sensors, crankshaft sensors, exhaust gas sensors, and the like. The plurality of actuators 181 may include one or more of an inlet valve actuator, an ignition plug actuator, a bracket actuator, and the like.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 4:
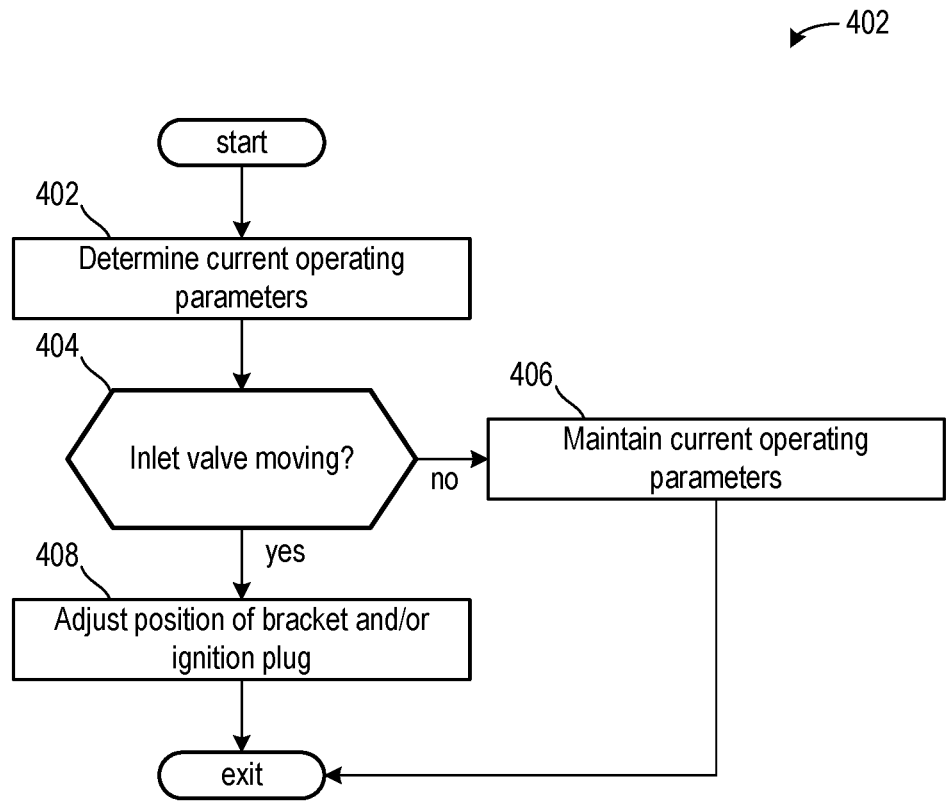
FIG. 4 shows a method for adjusting a bracket or the ignition plug in response to an inlet valve position.

Turning now to FIG. 4, it shows a method 400 for adjusting a position of one or more of the bracket and the ignition plug in response to an inlet valve actuation. Instructions for carrying out method 400 may be executed by a controller based on instructions stored on a memory of the controller and in conjunction with signals received from sensors of the engine system, such as the sensors described above with reference to FIG. 3. The controller may employ engine actuators of the engine system to adjust engine operation, according to the methods described below.

The method 400 begins at 402, which includes determining current operating parameters. Current operating parameters may include one or more or but are not limited to a throttle position, engine speed, vehicle speed, engine temperature, manifold pressure, EGR flow rate, and air/fuel ratio.

The method 400 proceeds to 404, which includes determining if an inlet valve is moving. The controller may determine the inlet valve is moving based on feedback from an inlet valve actuator. If the inlet valve is not moving, then the method 400 proceeds to 406 to maintain current operating parameters and does not adjust a position of one or more of the bracket and the ignition plug.

If the inlet valve is moving, then the method 400 proceeds to 408, which includes adjusting a position of the bracket and/or the ignition plug. For example, if the inlet valve is moving from a fully closed position where no air is permitted to enter the combustion chamber to a fully open position, where a maximum air flow into the combustion chamber is permitted, then the bracket and/or the ignition plug may be actuated to fully align the first and second flow channels. Additionally or alternatively, if the inlet valve is actuated to a partially open position between the fully open and fully closed positions, then the bracket and/or the ignition plug may be actuated to only partially align the first and second flow channels. In one example, if the partially open position is 50% open, then the bracket and the ignition plug may be actuated to align the first and second flow channels by 50%. In this way, the alignment of the first and second flow channels may be proportional to a degree of opening of the inlet valve.

Additionally or alternatively, in some examples, the alignment of the first and second flow channels may be further based on an EGR flow rate, a previous combustion cycle, a desired flushing amount, and the like. For example, if the EGR flow rate increases, then the alignment of the first and second flow channels may increase. Alternatively, if the EGR flow rate increases, then the alignment of the first and second flow channels may decrease.

In this way, one or more cylinders of an engine may comprise a prechamber configured to be flushed with intake air based on a position of one or more of an ignition plug and a bracket. The technical effect of adjusting a position of the bracket and/or the ignition plug to adjust an alignment between flow channels is to adjust air flow to the prechamber for flushing while still allowing a desired amount of air flow to the combustion chamber.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an ignition plug comprising an outer wall, a combustion-chamber-side end, and a combustion-chamber-averted end, wherein the outer wall comprises a combustion-chamber-side region configured to be arranged in a combustion chamber, wherein a prechamber is arranged at the combustion-chamber-side end, the prechamber comprising at least one ignition electrode and at least one combustion-chamber-side opening configured to conduct a mixture ignited in the prechamber into the combustion chamber; wherein
the outer wall is at least partially surrounded in a circumferential direction by a bracket, wherein a first flow channel extends through the outer wall and a second flow channel extends through the bracket, wherein the first flow channel and the second flow channel fluidly couple the prechamber to the combustion-chamber-side region, and wherein the first flow channel and the second flow channel are configured to be opened and closed based on a displacement of the bracket.

2. The system of claim 1, wherein a first spacing measured from an intersection between the first flow channel and an interior volume of the prechamber to a bottom of the prechamber is greater than a second spacing measured from the at least one ignition electrode to the bottom of the prechamber.

3. The system of claim 1, wherein the first flow channel and the second flow channel are configured as a passage bore.

4. The system of claim 1, wherein a cross-section flow through area of the first flow channel and the second flow channel is adjustable.

5. The system of claim 1, wherein the bracket is at least partially displaceable in relation to the outer wall in an axial direction.

6. The system of claim 1, wherein the bracket is rotatable about an axial axis.

7. The system of claim 1, wherein the bracket is configured to be displaceable relative to a cylinder head in an axial direction or a radial direction.

8. The system of claim 1, wherein a cylinder head comprises an inlet valve and wherein the bracket is displaced based on a position of the inlet valve, wherein the bracket and the ignition plug are housed adjacent to the cylinder head.

9. The system of claim 8, wherein the bracket is displaced to at least partially align the first flow channel and the second flow channel in response to the inlet valve being in an at least partially open position.

10. The system of claim 8, wherein the bracket is displaced into the combustion chamber when the position of the inlet valve is an open position, and wherein the bracket is displaced away from the combustion chamber when the position of the inlet valve is a closed position.

11. A method, comprising:
adjusting an alignment between a first flow channel and a second flow channel in response to a position of an inlet valve, wherein the first flow channel is arranged in an outer wall of an ignition plug of a prechamber and the second flow channel is arranged in a bracket circumferentially surrounding the outer wall.

12. The method of claim 11, wherein the adjusting comprises increasing the alignment between the first flow channel and the second flow channel in response to the inlet valve moving to a more open position, wherein the adjusting further comprising decreasing the alignment between the first flow channel and the second flow channel in response to the inlet valve moving to a more closed position, wherein the more open position of the inlet valve permits more air to flow into a combustion chamber than the more closed position.

13. The method of claim 11, wherein adjusting further comprises axially displacing the bracket relative to the outer wall and to a cylinder head to or away from a combustion chamber.

14. The method of claim 11, wherein adjusting further comprises radially displacing the bracket relative to the outer wall and to a cylinder head.

15. The method of claim 11, wherein adjusting the alignment further comprises proportionally adjusting a degree of the alignment to a degree of opening of the inlet valve.

16. An engine system, comprising:
a plurality of combustion chambers, each combustion chamber of the plurality of combustion chambers comprising a prechamber, an ignition plug, and an ignition electrode positioned to ignite a mixture within the prechamber; wherein the ignition plug comprises a first flow channel; and
a bracket at least partially circumferentially surrounding the ignition plug, wherein the bracket comprises a second flow channel configured to align and fluidly couple to the first flow channel based on an actuation of the bracket.

17. The engine system of claim 16, wherein the second flow channel is spaced away from an inlet port of an inlet valve arranged in a cylinder head of a combustion chamber of the plurality of combustion chambers.

18. The engine system of claim 16, wherein a distance from the first flow channel to a bottom portion of the prechamber is greater than a distance from the ignition electrode to the bottom portion of the prechamber.

19. The engine system of claim 16, wherein the actuation results in an axial or a radial movement of the bracket relative to a cylinder head and the ignition plug.

20. The engine system of claim 16, further comprising a controller with instructions stored on memory thereof that when executed enable the controller to actuate the bracket and at least partially align the first flow channel and the second flow channel in response to the inlet valve moving from a fully closed position to an open position.

* * * * *

UNITED STATES PATENT AND TRADEMARK OFFICE
CERTIFICATE OF CORRECTION

| | | |
|---|---|---|
| PATENT NO. | : 11,022,026 B2 | Page 1 of 1 |
| APPLICATION NO. | : 16/918210 | |
| DATED | : June 1, 2021 | |
| INVENTOR(S) | : Frank Kraemer et al. | |

It is certified that error appears in the above-identified patent and that said Letters Patent is hereby corrected as shown below:

On the Title Page

Item (30), add "July 3, 2019 (DE) .................... 10 2019 209 7537", to the Foreign Application Priority Data section.

Signed and Sealed this
Third Day of September, 2024

Katherine Kelly Vidal
*Director of the United States Patent and Trademark Office*